United States Patent Office 2,815,287
Patented Dec. 3, 1957

2,815,287

PROCESS FOR EXTRACTING THE COLORING MATTER FROM ANNATTO SEEDS

Harold M. Barnett, deceased, late of Long Beach, Calif., by Margaret B. Barnett, executrix, and Henry M. Espoy, Long Beach, Calif.; said Espoy assignor to said Margaret B. Barnett, executrix No Drawing. Application April 20, 1956, Serial No. 579,441

14 Claims. (Cl. 99—148)

This invention relates to a process for extracting the coloring matter from annatto seeds.

One object of the invention is to provide a process for economically recovering the coloring matter from annatto seeds. Another object is to provide a continuous process for the oil extraction of the coloring matter from annatto seeds. Another object is to provide a process for recovering bixin crystals from annatto seeds. Still another object is to provide a process for extraction of the coloring matter of annatto seeds under conditions which control the color of the extracted dyes.

These and other objects are attained by our invention, which will now be more particularly set forth.

The tropical plant known botanically as *Bixa orellana*, and more popularly as annatto, produces seeds which are the source of a natural dyestuff known generally as annatto. The natural coloring matter consists of at least two pigments, bixin and a minor proportion of orellin. Various methods used by natives have been described (Tanchico and West, Philippine Journal of Science, vol. 61, No. 4, 1937). The coloring matter is contained in the thin layer of dried pulp on the outside of the seeds.

We have discovered that the natural dyes of annatto seeds may be efficiently extracted from the whole annatto seeds by agitating the seeds in the presence of fatty oils, including natural vegetable or animal oils, fatty acids, and fatty alcohols, either in batches, or as a continuous process. We have also discovered that the dyes of annatto seed may be recovered in the form of a suspension of fine crystals and in solution in oil by tumbling the seeds alone or with a scouring material such as coarse sand. We have also found that if the dried seeds with the attached layer of dried pulp are first swelled in the presence of water or water vapor, and are then subjected to extraction with oil, the recovery of the natural dye up to 90 percent or more may be obtained. We have further discovered that a greater concentration of the dye may be recovered in the extracting oil if it contains either fatty acids or fatty alcohols. We have also discovered that by heating the oily extract, rearrangement of the bixin color compound produces a purer yellow color, and when the extraction is made with hot oil, the extraction and enhancement of the yellow color may be simultaneously effected.

Where the word "seeds" is used herein, it refers to the commercial seeds as marketed, including the dried pulp on the outer surface. The pigment content of the dried seeds with the pulp varies from about 1.3 to 4.0 percent.

The dry annatto seeds may be extracted by hot vegetable oil passing through a tall vessel containing the seeds, the vessel being heated to about 100° C., and the oil being pre-heated to about the same temperature before pouring it on top of the seeds in the vessel to recover the dyes dissolved in the oil. The extract was drained from the bottom of the tall vessel, and about 30 percent of the contained coloring material was removed by a single pass through the seeds, and the oil being substantially saturated with the dye.

In another example, 25 parts by weight of seeds were stirred in a vessel with 100 parts of cottonseed oil at 130° C. for one hour. Fifty-four percent of the pigment was removed from the seeds.

In still another example, 100 parts by weight of the annatto seeds were soaked in an equal weight of water for about 16 hours. The swollen seeds were stirred for one hour with an equal weight of cottonseed oil at 40 to 50° C. The seeds were strained out by means of a 60 mesh screen, and the oily emulsion or suspension of bixin was centrifuged, resulting in a pasty semi-solid mass which contained about 3 percent bixin. This paste concentrate may be used directly for coloring purposes, or the bixin may be crystallized from a solution of the paste in an organic solvent, such as chloroform, to produce pure crystalline bixin.

The dye may be efficiently extracted in an inclined tubular extractor having rotary screw elevating means for carrying the seeds up the tube, with a counter-current of oil fed into the tube in the upper portion and withdrawn at the lower end. The tumbling of the seeds in the oil by the screw conveyor results in effective extraction of the dye. In this extraction method, especially when the amount of oil is less than enough to dissolve all of the available dye, the combined tumbling and extraction physically removes fine particles of the natural dye, and this crystalline material may be recovered by filtering the saturated oil extract. If the oil extract is saturated with dye in the hot extraction procedure and is then cooled, crystalline dyes also separate out and may be recovered by filtration.

Scouring granules, such as coarse sand or the like, may be mixed with the seeds during the extraction in the inclined screw extractor to assist in physically removing the dye from the seeds.

When oleic acid was used in place of the cottonseed oil in extracting a batch of the seeds by stirring, a high percentage of pigment was dissolved, in one case being 72 percent of the contained pigment dissolved in the extracting liquid. When the oleic acid was heated to about 95° C., 37 percent of the pigment was extracted in a first extraction with 100 parts by weight of oleic acid to 23 parts by weight of seeds; a second extraction with 100 parts by weight of fresh oleic acid removed another 25 percent of the original pigment; and a third extraction with 100 parts by weight of fresh oleic acid removed 13 percent of the pigment present originally on the seeds.

The comparative results of extracting the annatto seeds with various hot fatty oil solvents is given in Table I. The batch extraction consisted of mechanically agitating 25 parts by weight of the dry seeds with 100 parts by weight of each of the solvents named, for one hour at the indicated temperature, then decanting and filtering the solvent extract and analyzing the extract and the residual seeds.

Table I

| Solvent | Cotton-seed Oil | Oleic Acid | Oleyl Alcohol |
|---|---|---|---|
| Operating temperature, ° C | 130 | 120–125 | 120–130 |
| Parts by weight of extract | 94.8 | 96.0 | 94.2 |
| Extinction coefficient ($E_{1\,cm}^{1\%}$), 470 mµ (Chloroform) | 3.95 | 3.22 | 3.19 |
| Percent of input remaining in extracted seeds | 58.0 | 14.3 | 17.4 |

A similar extraction was carried out after the 25 parts by weight of seeds had been soaked with 20 parts by weight of water for twelve hours, following the same procedure. The results are shown in Table II.

Table II

| Solvent | Cottonseed Oil | Oleic Acid |
|---|---|---|
| Operating Temperature, ° C | 130 | 125 |
| Parts by weight of extract | 93.3 | 92.7 |
| Extinction coefficient ($E_{1cm}^{1\%}$, 470 mµ, (Chloroform) | 4.75 | 4.64 |
| Percent of input remaining in extracted seeds | 17.5 | 10.4 |

In another illustrative example, 24 parts by weight of dry seeds were soaked at room temperature in 30 parts by weight of water for forty-eight hours. The water was nearly all taken up by the seeds, which became swollen. The swollen seeds were then agitated with 50 parts by weight of oil (10 parts cottonseed oil + 40 parts by weight of oleic acid) forming an emulsion with the excess water, following which the mixture was heated at 130° C. for one hour, with agitation. The oily liquid mixture was drained off, yielding 46 parts of extract and 25 parts by weight of seeds. The residual oil on the seeds amounted to about 5 parts, which was washed off with fresh oil to recover the dye. Analysis indicated that about 85 percent of the dye had been extracted.

In another illustrative example, seeds were pre-soaked in about an equal weight of water for 24 hours at room temperature. The swollen seeds were stirred for one hour with about 1½ times their wet weight of a 1:1 mixture of castor oil and cottonseed oil at 40 to 50° C. After straining off the seeds, the resultant extract was heated at 140° C. for 40 minutes. The product was of satisfactory color for butter, and about 98 percent dye was recovered in the extraction. By comparison, a similar extraction using seeds which had not been previously swelled with water, gave a recovery of only 47 percent of the bixin, and the color was not as yellow as desired for butter and margarine.

It is not desirable to soak the seeds for any longer time than is necessary to swell the pulp and to maintain the whole seed form, since any fermentation or decomposition of the seeds results in physical breakdown which interferes with effective extraction by the oil. The seeds may also be subjected to a high humidity atmosphere for sufficient time to swell the seeds. The swelled up substantially whole seeds are readily extracted with either cold or hot oil.

The coloring matter extractable by oil from the annatto seeds is a mixture of red and yellow pigments. The proportion of red pigment is progressively decreased by subjecting the material to heat for longer times. For butter or margarine coloring, the yellow or orange-yellow color is generally preferred. It was found that controlling the heating of the oil in which the pigments are dissolved, to different temperatures for different lengths of time, provides the means for controlling the final color. For a color suitable for coloring butter and margarine, the following times and temperatures were found to give approximately the same shade.

100° C. for 5 to 7 hours
120° C. for 2 to 2½ hours
130° C. for 45 to 55 minutes
140° C. for 23 to 25 minutes
150° C. for 10 to 12 minutes
165° C. for 3 minutes
177° C. for 0.75 to 1 minute We have found that the most satisfactory method of establishing whether the annatto extract has been heated sufficiently to give the desired color is to analyze the extract by means of a spectrophotometer. Through the use of such an instrument, the amount of light absorbed by a given solution can be determined at different wavelengths. In the case of annatto extract which has not been heated above 90° C., the light absorption of a chloroform solution of the extract at 435 millimicrons is only about seventy percent of the absorption at 470 millimicrons. Upon heating at temperatures above 100° C., the ratio of light absorption between 435 millimicrons and 470 millimicrons changes so that eventually the light absorption at 435 millimicrons is considerably greater than at 470 millimicrons. This change is accompanied by a change in the visual color of the extract from red to yellow. We consider that when the light absorption of a chloroform solution of the extract at 435 millimicrons approximates that at 470 millimicrons in the same solution, the desired shade of product has been obtained.

The solubility at room temperature in cottonseed oil of the converted mixture of red and yellow pigment is about 0.23 percent, whereas only about 0.05 percent of the natural (unchanged) pigment is soluble in cottonseed oil. The solubility of the natural pigment in oleic acid was found to be 0.23 percent, whereas the solubility of the converted yellow pigment was 0.52 percent. The oil extraction is therefore much more efficient when the extraction process is carried out at temperatures which also result in conversion to the yellow dye form.

We claim:

1. The process of extracting pigments from the surfaces of whole annatto seeds comprising the steps of agitating a mass of said whole seeds with a fatty oil, and separating the residual whole seeds from the liquid extract.

2. The process of extracting pigments from the surfaces of whole annatto seeds and simultaneously converting said pigments to a purer yellow color, comprising the steps of agitating a mass of said whole seeds with a hot fatty oil, and separating the residual whole seeds from the liquid extract.

3. The process of extracting pigments from the surfaces of whole annatto seeds comprising the steps of agitating a mass consisting of a mixture of said seeds and a granular surface scouring agent with a fatty oil, and separating the residue of whole seeds and scouring agent from the liquid extract.

4. The process of extracting pigments from the surfaces of whole annatto seeds comprising the steps of subjecting said seeds to water for a time sufficient to swell said seeds while maintaining the whole seed structures, contacting said swollen whole seeds with a fatty oil, and removing the extracted whole seed solids from the oily liquid.

5. The process of extracting pigments from the surfaces of whole annatto seeds comprising the steps of soaking said seeds in water for a time sufficient to swell said seeds while maintaining the whole seed structures, contacting said swollen seeds with fatty oil, and removing the extracted whole seed solids from the oily liquid.

6. The process of extracting pigments from the surfaces of whole annatto seeds comprising the steps of soaking said seeds in water for a time sufficient to swell said seeds while maintaining the whole seed structure, agitating a mixture of said swollen whole seeds and a granular surface scouring agent with a fatty oil, and separating the residue of extracted whole seeds and scouring agent from the liquid extract.

7. The process of preparing a yellow dye suitable for food coloring comprising the steps of treating annatto seeds with water for a time sufficient to swell said seeds while maintaining the whole seed structure, removing any excess water, extracting the whole swelled annatto seeds with hot fatty oil, maintaining said oil at temperatures in the range from about 100° C. to about 175° C., and removing the oily extract from the remaining whole seed solids.

8. The process of extracting pigments from the surfaces of whole annatto seeds comprising the steps of agitating said whole seeds with a fatty oil containing free fatty acid, and separating the residue from the liquid extract.

9. The process of extracting pigments from the surfaces of whole annatto seeds comprising the steps of agitating a mixture of said whole seeds and a granular surface scouring agent with a fatty oil containing at least 20 percent free fatty acid, and separating the whole seed residue from the liquid extract.

10. The process of extracting pigments from the surfaces of whole annatto seeds comprising the steps of treating said seeds with water for a time sufficient to swell said seeds while maintaining the whole seed structure, contacting said swollen whole seeds with fatty oil containing at least 20 percent free fatty acid, and removing the whole seed solids from the liquid portion.

11. The process of extracting pigments from the surfaces of whole annatto seeds comprising the steps of treating said seeds with water for a time sufficient to swell said seeds while maintaining the whole seed structure, agitating a mass of said swollen whole seeds with hot fatty oil containing at least 20 percent free fatty acid, and removing the whole seed solids from the liquid portion.

12. The process of extracting pigments from the surfaces of whole annatto seeds comprising the steps of treating said seeds with water for a time sufficient to swell said seeds while maintaining the whole seed structure, agitating said swollen whole seeds with hot fatty oil to which has been added a substantial proportion of a fatty alcohol, and removing the whole seed solids from the liquid portion.

13. A continuous process for the extraction of annatto seeds to recover the natural dyes thereon comprising the steps of continuously feeding annatto seeds on an upwardly inclined conveyor, agitating the mass of said seeds on said conveyor, continuously flowing a stream of hot fatty oil through said agitated mass of seeds, and recovering the oily extract after it has passed through the seeds on said conveyor.

14. The process of recovering pigments from the surfaces of whole annatto seeds comprising the steps of treating said seeds with water for a sufficient time to swell said seeds while maintaining the whole seed structure, agitating said swollen whole seeds with a quantity of a fatty oil insufficient to dissolve said pigments, screening out the whole swelled seeds from which the pigments have been removed, and separating the dissolved pigment and oil from the solid particles of dye.

References Cited in the file of this patent

UNITED STATES PATENTS

| 59,975 | Dake | Nov. 27, 1866 |
| 1,203,594 | Ellis | Nov. 7, 1916 |

OTHER REFERENCES

Chem. Abs., vol. 47, 1953, page 10146c.

"The Butter Industry," by Hunziker, 3rd edition, published by the author, La Grange, Illinois (1940), pages 596 and 601.